(12) United States Patent
Sorkin

(10) Patent No.: US 7,267,375 B1
(45) Date of Patent: Sep. 11, 2007

(54) DUCT COUPLER APPARATUS

(76) Inventor: Felix L. Sorkin, 13022 Trinity Dr., Stafford, TX (US) 77477

( * ) Notice: Subject to any disclaimer, the term of this patent is extended or adjusted under 35 U.S.C. 154(b) by 260 days.

(21) Appl. No.: 10/972,265

(22) Filed: Oct. 25, 2004

(51) Int. Cl.
F16L 19/00 (2006.01)

(52) U.S. Cl. .................. 285/354; 285/245; 285/369; 285/903; 403/286; 403/288

(58) Field of Classification Search .............. 285/32, 285/89, 356, 369, 372, 390, 393, 417, 418, 285/903, 243, 245, 251, 255, 322, 383, 95, 285/233, 423, 908; 52/223.1, 223.14, 223.4, 52/223.8, 223.13, 726.1; 403/286, 288, 293, 403/305, 314; 277/609, 613, 616, 622
See application file for complete search history.

(56) References Cited

U.S. PATENT DOCUMENTS

| | | | | |
|---|---|---|---|---|
| 2,850,299 A | * | 9/1958 | Risley | 285/48 |
| 3,233,925 A | * | 2/1966 | Stevens | 285/340 |
| 3,813,479 A | * | 5/1974 | Olivero | 174/88 C |
| 3,899,198 A | * | 8/1975 | Maroschak | 285/27 |
| 3,917,324 A | * | 11/1975 | Wakatsuki et al. | 285/341 |
| 5,320,319 A | | 6/1994 | Winger et al. | |
| 5,474,335 A | | 12/1995 | Sorkin | |
| 5,775,849 A | | 7/1998 | Sorkin | |
| 5,954,373 A | * | 9/1999 | Sorkin | 285/312 |

\* cited by examiner

*Primary Examiner*—Aaron Dunwoody
*Assistant Examiner*—Fannie C. Kee
(74) *Attorney, Agent, or Firm*—Egbert Law Offices

(57) ABSTRACT

An apparatus for joining ends of a pair of ducts together in end-to-end relationship has a collar with a first end portion and a second end portion, a first coupler element translatably secured to an exterior of the collar for moving the first end portion between first and second positions, and a second coupler element translatably secured to the exterior of the collar so as to move the second end portion between first and second positions. The end portions have a plurality of fingers that are movable so as to be free of the surfaces of the duct when in the first position and which contact a rib of the duct when in the second position. The collar and the coupler elements form a liquid-tight seal over the respective ends of the pair of ducts.

8 Claims, 3 Drawing Sheets

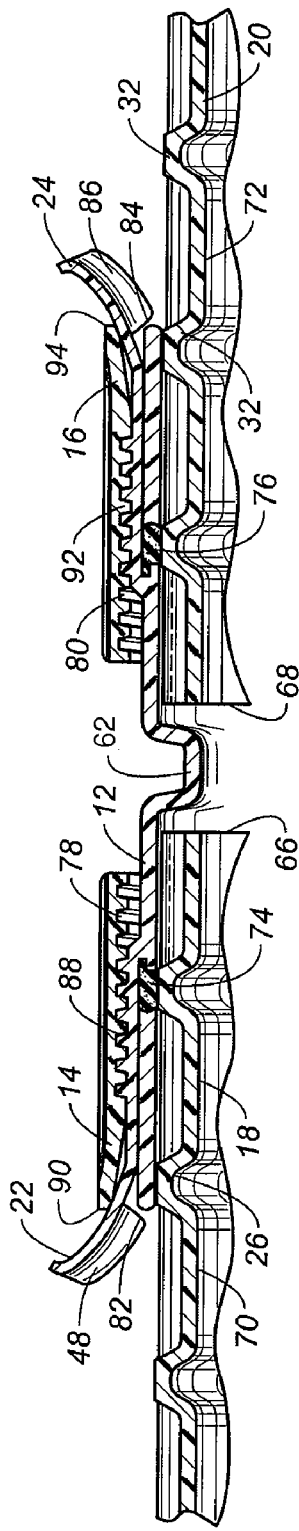
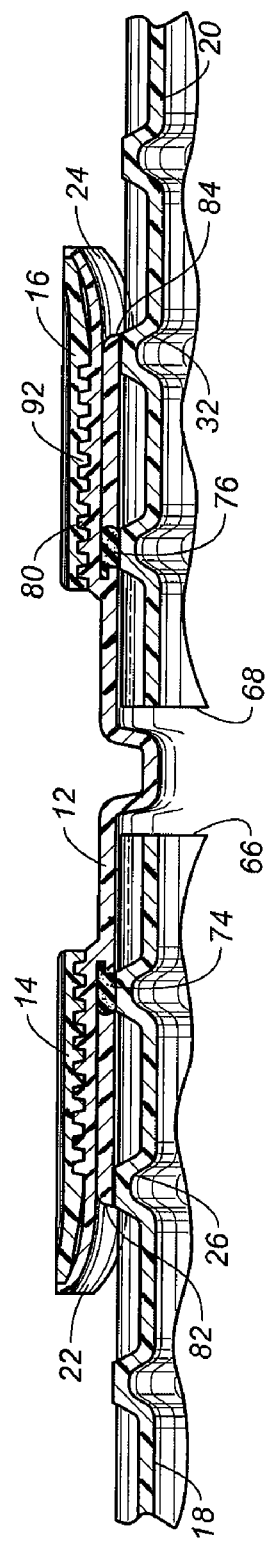
FIG. 2
FIG. 3

DUCT COUPLER APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a duct coupler, and more particularly to a coupler for providing a water-tight joint between adjacent sections of duct used to provide a channel for multi-strand post-tensioning of concrete structures.

BACKGROUND OF THE INVENTION

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly used in such post-tensioning operations, there are provided anchors for anchoring the ends of the cables suspended therebetween. In the course of tensioning the cable in a concrete structure, a hydraulic jack or the like is releasably attached to one of the exposed ends of each cable for applying a predetermined amount of tension to the tendon, which extends through the anchor. When the desired amount of tension is applied to the cable, wedges, threaded nuts, or the like, are used to capture the cable at the anchor plate and, as the jack is removed from the tendon, to prevent its relaxation and hold it in its stressed condition.

Multi-strand tensioning is used when forming especially long post-tensioned concrete structures, or those which must carry especially heavy loads, such as elongated concrete beams for buildings, bridges, highway overpasses, etc. Multiple axially aligned strands of cable are used in order to achieve the required compressive forces for offsetting the anticipated loads. Special multi-strand anchors are utilized, with ports for the desired number of tensioning cables. Individual cables are then strung between the anchors, tensioned and locked as described above for the conventional monofilament post-tensioning system.

As with monofilament installations, it is highly desirable to protect the tensioned steel cables from corrosive elements, such as de-icing chemicals, sea water, brackish water, and even rain water which could enter through cracks or pores in the concrete and eventually cause corrosion and loss of tension of the cables. In multi-strand applications, the cables typically are protected against exposure to corrosive elements by surrounding them with a metal duct or, more recently, with a flexible duct made of an impermeable material, such as plastic. The protective duct extends between the anchors and in surrounding relationship to the bundle of tensioning cables. Flexible duct, which typically is provided in 20 to 40 foot sections is sealed at each end to an anchor and between adjacent sections of duct to provide a water-tight channel. Grout then may be pumped into the interior of the duct in surrounding relationship to the cables to provide further protection.

Several approaches have been tried to solve the problem of quickly, inexpensively and securely sealing the joints between adjacent sections of duct used in multi-strand post-tensioned applications. However, all prior art devices have utilized a plurality of arcuate sections which must be assembled at a joint around the ends of adjacent duct sections. Wedges, compression bolts or the like then are used to compress the joined sections into sealing engagement with the duct and with each other. Such prior art devices have been cumbersome to use and have proved somewhat unreliable in their ability to exclude moisture or other corrosive elements from the interior of the ducts.

Several patents have issued relating to duct couplers. For example, U.S. Pat. No. 5,320,391, issued on Jun. 14, 1994, to K. Luthi describes a coupling element which is fitted with chamfered flanges. The sheaths of the coupler have protrusions which are inserted into the coupling element with a tubular element which forms the end of the sheaths. A sealing ring is inserted between each of the flanges and protrusions of the sheaths. The flanges and the protrusions are held together by sloping surfaces and by a groove worked within each socket. Also, U.S. Pat. No. 5,474,335, issued on Dec. 12, 1995, to the present inventor, describes a duct coupler for joining and sealing between adjacent sections of the duct. The coupler includes a body, flexible cantilevered sections on the end of the body adapted to pass over annular protrusions on the duct and locking rings for locking the cantilevered flexible sections into position, so as to lock the coupler onto the duct.

U.S. Pat. No. 5,775,849, issued on Jul. 7, 1998 to the present inventor, describes a coupler as used for ducts in post-tension anchorage systems. This duct system includes a first duct having a plurality of corrugations extending radially outwardly therefrom, a second duct having a plurality of corrugations extending radially outwardly therefrom, and a tubular body threadedly receiving the first duct at one end and threadedly receiving the second duct at the opposite end. The tubular body has a first threaded section formed on an inner wall of the tubular body adjacent one end of the tubular body and a second threaded section formed on the inner wall of the tubular body adjacent an opposite end of the tubular body. The threaded sections are formed of a harder polymeric material than the polymeric material of the first and second ducts. The tubular body has an outer diameter which is less than the diameter of the ducts at the corrugations. The first and second threaded sections have a maximum inner diameter which is less than the outer diameter of the ducts at the end of the ducts. First and second elastomeric seals are affixed to opposite end of the tubular body and juxtaposed against a surface of a corrugation of the first and second ducts.

U.S. Pat. No. 5,954,373, issued on Sep. 21, 1999 to the present inventor, describes a different type of duct coupler apparatus. The duct coupler apparatus of this patent includes a tubular body with an interior passageway between a first open end and a second open end. A shoulder is formed within the tubular body between the open ends. A seal is connected to the shoulder so as to form a liquid-tight seal with a duct received within one of the open ends. A compression device is hingedly connected to the tubular body for urging the duct into compressive contact with the seal. The compression device has a portion extending exterior of the tubular body. The compression device includes an arm with an end hingedly connected to the tubular body and having an abutment surface adjacent the end. The arm is movable between a first position extending outwardly of an exterior of the tubular body and a second position aligned with an exterior surface of the tubular body. A latching member is connected to an opposite end of the arm and serves to affix the arm in the second position. The abutment surface of the arm serves to push a corrugation of the duct against the seal and against the shoulder so as to form a liquid-tight seal between the duct and the interior of the coupler.

It is an object of the present invention to provide a coupler for sealing between adjacent sections of an elongated duct.

It is another object of the present invention to provide a coupler which facilitates installation by the user and which, when engaged with the opposed ends, will securely seal against the intrusion of corrosive elements and to prevent the leakage of sealing materials from the interior of the duct.

It is a further object of the present invention to provide a coupler which includes a latching mechanism for securely engaging coupler sections together and for conforming the internal seals to the surfaces of the duct.

It is another object of the present invention to provide a coupler which is easy to use, easy to manufacture and relatively inexpensive.

It is still a further object of the present invention to provide a duct coupler apparatus which maintains the integrity of an annular seal in the area of the connections between the coupler and the duct.

It is still another object of the present invention to provide a duct coupler apparatus which prevents the ducts from longitudinally separating from each other.

These and other objects and advantages of the present invention will become apparent from a reading of the attached specification and appended claims.

BRIEF SUMMARY OF THE INVENTION

The present invention is an apparatus for joining the ends of a pair of ducts together in end-to-end relationship. The apparatus of the present invention has a collar with an interior suitable for receiving the pair of ducts therein in end-to-end relationship. The collar has a first end portion at one end thereof and a second end portion at an opposite end thereof. Each of the first and second end portions are movable between a first position spaced away from the interior and a second position extending toward the interior. A first coupler element is translatably secured to an exterior of the collar. The first coupler element is translatable so as to move the first end portion between first and second positions. A second coupler element is translatably secured to the exterior of the collar. The second coupler element is also translatable so as to move the second end portion between the first and second positions.

In the present invention, the collar has a first annular seal extending around the interior of the collar and a second annular seal extending around the interior of the collar. The first annular seal is adjacent one end of the collar. The second annular seal is adjacent the opposite end of the collar. The first annular seal extends in spaced parallel relationship to the second annular seal.

The first coupler element is threadedly translatable on the collar. The first coupler element is rotatable so as to move the first end portion between the first and second positions. The second coupler element is also threadedly translatable on the collar. The second coupler element is rotatable so as to move the second end portion between the first and second positions. The first end portion includes a finger element which extends at an acute angle with respect to a longitudinal axis of the collar when in the first position and extends in generally parallel relationship to the longitudinal axis when in the second position. The second end portion also includes a finger element that extends at an acute angle with respect to a longitudinal axis of the collar when in the first position and in a generally parallel relationship to the longitudinal axis when in the second position. Each of these finger elements actually comprises a plurality of finger elements extending outwardly of the respective ends of the collar. These finger elements are radially spaced from each other around a diameter of the collar. Each of the finger elements has a shoulder formed on an inner surface thereof. The shoulder element contacts a surface of a rib of the respective duct when the end portion is in the second position.

Each of the collar and the first and second coupler elements are formed of a polymeric material. Each of the first and second coupler elements has a plurality of ribs formed on an exterior surface thereof. This plurality of ribs extends longitudinally for a portion of a length of the coupler element. The plurality of ribs are radially spaced from each other around a diameter of the coupler element. The collar has an indented portion that is formed generally between the ends thereof and positioned so as to be between the respective ends of the ducts.

In use, a first duct and a second duct have respective ends received within the interior of the collar. The end portions are movable to the second position such that the shoulder on the finger elements contacts a surface of the respective ribs on the ducts so as to lock the ducts in a proper end-to-end longitudinally aligned position. A plurality of tendons extend longitudinally through the interior of the ducts and through the interior of the collar. A grout material fills the interior of the first and second ducts. The collar and the first and second coupler elements form a liquid-tight seal with the first and second ducts respectively so as to prevent grout from flowing outwardly of the first and second ducts and to prevent the first and second ducts from moving longitudinally from each other when the first and second end portions are in the second position.

BRIEF DESCRIPTION OF THE SEVERAL VIEWS OF THE DRAWINGS

FIG. 2 is a cross-sectional view showing the end portions of the collar of the coupler apparatus of the present invention in the first position.

FIG. 3 is a cross-sectional view showing the end portions of the collar of the coupler of the present invention in the second locked position.

DETAILED DESCRIPTION OF THE INVENTION

Figure 1:
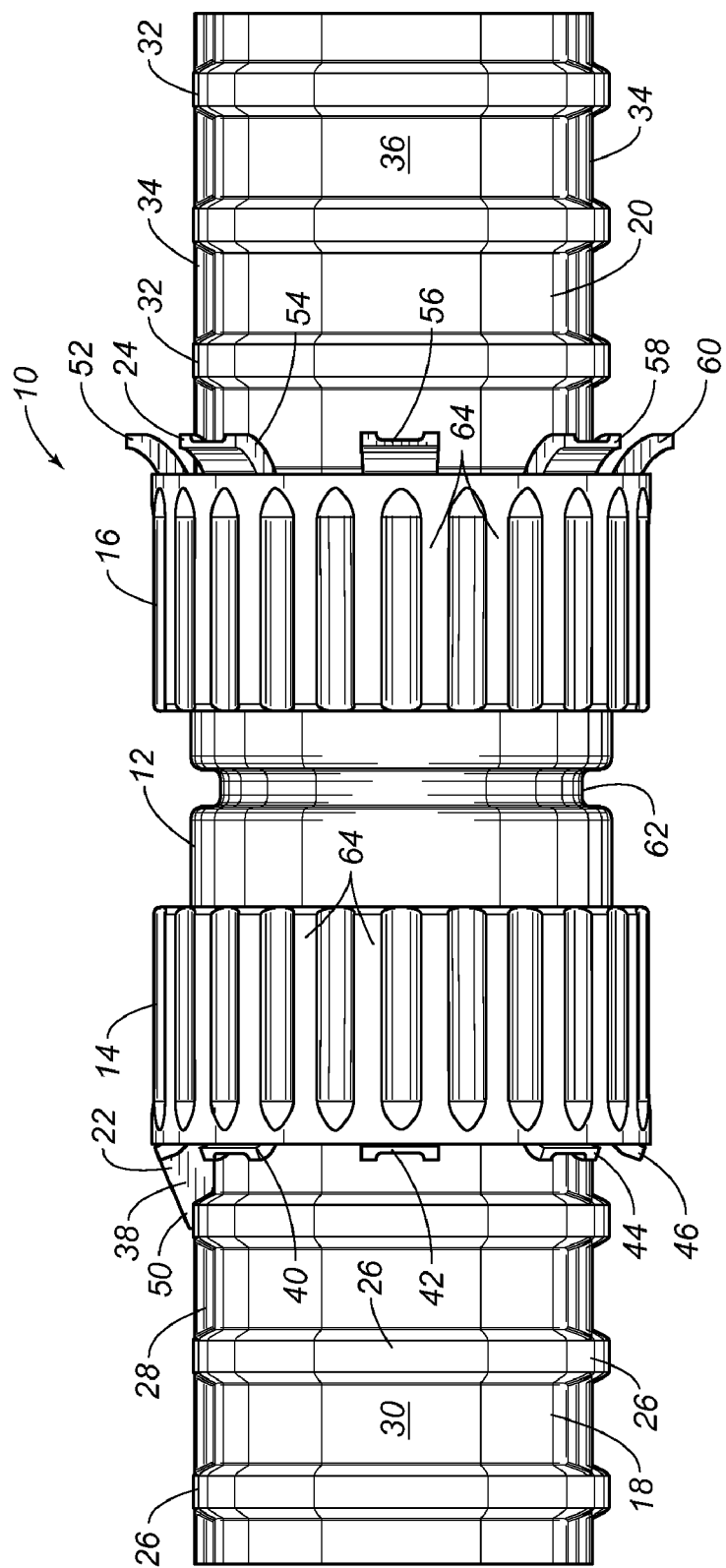
FIG. 1 is a side elevational view showing the coupler apparatus of the present invention as applied to first and second ducts.

Referring to FIG. 1, there is shown the coupler apparatus 10 in accordance with the preferred embodiment of the present invention. The coupler apparatus 10 includes a collar 12, a first coupler element 14 and a second coupler element 16. A first duct 18 is received within the interior of the collar 12 and within the interior of the first coupler element 14. A second duct 20 is received within the collar 12 and within the interior of the second coupler element 16. The collar 12 has an interior suitable for receiving the ducts 18 and 20 in end-to-end relationship and in generally longitudinal alignment. The collar 12 has a first end portion 22 at one end thereof and a second end portion 24 at an opposite end thereof. Each of the end portions 22 and 24 are movable between a first position (illustrated by end portion 24) spaced away from the interior of the collar 12 and a second position (illustrated by end portion 22) which extends toward the interior of the collar 12. The first coupler element 14 is translatably secured to the exterior of the collar 12. The first coupler element 14 is translatable so as to move the first end portion 22 between the first and second positions. The second coupler element 16 is also translatably secured to the exterior of the collar 12. The second coupler element 16 is translatable so as to move the second end portion 24 between the first and second positions.

As can be seen in FIG. 1, the first duct 18 has a plurality of ribs 26 formed thereon. Longitudinal channels 28 extend between the ribs 26 and allow liquid and grout therein to communicate between the ribs 26. Longitudinal channels 28 have an outer edge which is flush with the outer diameter of the respective ribs 26. The first duct 18 has an outer wall 30 which extends between the ribs 26 and defines the interior of the duct 18. The second duct 20 similarly has a plurality of ribs 32, longitudinal channels 34 and wall 36. The first duct 18 is identical to the second duct 20. In normal use, the ducts 18 and 20 will receive tendons therein and allow a grout material to fill the interior thereof. The respective channels 28 and 34 allow grout to fill the interior of the respective ducts 18 and 20 and to flow into the ribs 26 and 32, respectively.

In past practice, it has been somewhat difficult to join the respective ends of the ducts 18 and 20 in a properly sealed end-to-end relationship. It is important to consider both the liquid-tight sealing of the ducts 18 and 20 and to prevent the separation of the ducts 18 and 20 from each other. Since time of installation is an important requirement for construction, the coupler apparatus 10 should be sufficiently usable so as to quickly allow the joining of the ends of ducts 18 and 20 together. Since the quality of labor can be poor at times, the coupler apparatus 10 should have the ability to be easily installed in a simple and effective manner without complex training or procedures. Additionally, the coupler apparatus 12 should provide a clear indication to an inspector that the ducts 18 and 20 are properly joined in end-to-end relationship.

As can be seen, the first end portion 22 has a plurality of finger elements 38, 40, 42, 44 and 46 extending outwardly therefrom. In FIG. 1, for the purposes of illustration, the finger element 38 is illustrated in its second position which serves to lock the first duct 18 in its proper position. The first end portion 22 has a lower surface 48 which will reside in surface-to-surface relationship with the wall 30 of duct 18. An extension element 50 extends outwardly as a tip from the finger element 38 so as to reside over the outer surface of the rib 26. An inclined surface extends between the tip 50 and the surface 48 so as to reside against the slanted surface of the rib 26. The remaining finger elements 40, 42, 44 and 46 are illustrated in the first position extending away from the surface of the duct. In normal use, the finger elements 38, 40, 42, 44 and 46 will move cooperatively relative to the translation of the first coupler element 14 on the collar 12.

The collar 12 has a plurality of finger elements 52, 54, 58, and 60 extending outwardly from an opposite end thereof of first end portion 22. Each of the finger elements 52, 54, 58, and 60 is illustrated in the first position spaced away from the exterior surface of the duct 20. The coupler element 16 is translatable relative to the collar 12 so as to move the finger elements 52, 54, 58, and 60 to the second position.

In FIG. 1, it can be seen that there is an indented portion 62 formed in the collar 12 generally between the ends of the ducts 18 and 20. The indented surface 62 will have an interior surface aligned with the interior surface of the respective ducts 18 and 20.

The collar 14 is translatable about one end of the collar 12. The translating motion in the preferred embodiment of the present invention is established by a threaded relationship between the exterior surface of the collar 12 and the interior surface of the coupler 14. In other embodiments of the present invention, the coupler element 14 is translatable by slidable or ratcheting motion. Suitable hinging mechanisms or other cantilever or lever actions can be incorporated within the apparatus 10 so as to facilitate proper translatable motion of the coupler elements 14 and 16 on the collar 12. Coupler element 16 will have a configuration similar to that of coupler element 14 and will translate in the same manner as coupler element 14. Each of the coupler elements 14 and 16 has a plurality of ribs 64 formed on an exterior surface thereof. Each of the plurality of ribs 64 extends longitudinally for at least a portion of the length of the respective coupler elements 14 and 16. The plurality of ribs are radially spaced from each other around the diameter of the respective coupler elements 14 and 16. Ribs 64 facilitate the ability of a worker to grasp the exterior surface of the coupler elements 14 and 16 and to provide the necessary translatable motion with respect to the movement of the coupler elements 14 and 16 onto the respective end portions 22 and 24.

FIG. 2 illustrates the collar 12 as having the end portions 22 and 24 in the first position away from the respective ducts 18 and 20. In FIG. 2, the collar 12 is illustrated as having the indented portion 62 formed between the respective ends 66 and 68 of ducts 18 and 20. The inward surface of the indented portion 62 is in coplanar alignment with the inner surface 70 of duct 18 and inner surface 72 of duct 20. The collar 12 has an annular seal 74 extending around the interior of the collar 12. A second annular seal 76 is also affixed to the collar 12 and extends around the interior of the collar 12. The annular seals 74 and 76 can be formed of a suitable elastomeric material such that the seal 74 establishes a liquid-tight relationship with the rib 26 of duct 18. The annular seal 76 will establish a liquid-tight seal with the rib 32 of duct 20. It can be seen that the collar 12 has an inner surface which will generally abut the tops of the respective shoulders 26 and 32 of the ducts 18 and 20. As such, the ducts 18 and 20 can be easily installed within the interior of the collar 12 by slidably inserting the ends 66 and 68 of ducts 18 and 20 into opposite ends of the collar 12.

In FIG. 2, it can be seen that the collar 12 has a threaded exterior surface 78. The collar 12 also has another threaded exterior surface 80 formed thereon. The end portion 22 is integrally formed with the collar 12 at one end of the collar 12. The second end portion 24 is also integrally formed with the collar 12 at the opposite end of the collar 12. The threaded portions 78 and 80 are respectively interposed between the indented portion 62 and the end portions 22 and 24. The end portion 22 has a shoulder 82 formed thereon. The end portion 24 also has a shoulder 84 formed thereon. Underlying surface 48 extends from shoulder 82 outwardly therefrom. Another underlying surface 86 is formed on the end portion 24 and extends outwardly from the shoulder 84. Underlying surfaces 48 and 86 will extend generally upwardly at an acute angle with respect to a longitudinal axis of the collar 12. In FIG. 2, the first position of the end portions 22 and 24 is particularly illustrated. As such, the shoulders 82 and 84, along with the surfaces 48 and 86, will be generally spaced away from the respective ducts 18 and 20 so as to allow for the free insertion of the ends 66 and 68 of ducts 18 and 20 into the collar 12.

The first coupler element 14 is illustrated as having interior threads 88 engaged with the exterior threads 78 of the collar 12. The first coupler element 14 has an abutment end 90 extending into contact with a surface of the end portion. Similarly, the second coupler element 16 has an interior threaded section 92 threadedly engaged with the exterior threads 80 of the collar 12. An abutment end 94 is formed on the coupler element 16 so as to reside against the surface of the end portion 24.

FIG. 3 illustrates how the coupler elements 14 and 16 translate so as to move the end portions 22 and 24 into their second or locking positions. In normal use, the first coupler element 14 will be rotated so that the interior threads 88 will translate along the exterior threads 78 at one end of the collar 12. The second coupler element 16 will similarly have its interior threads 92 rotate with respect to the exterior threads 80. This causes the abutment end 90 of coupler element 14 to urge against the surface of the end portion 22 and to move the end portion 22 downwardly. As a result, the shoulder 82 will reside in contact (illustrated in broken line fashion) against a surface of rib 26. The second coupler element 16 will work in a similar manner so that the shoulder 84 will reside in contact against a surface of the rib 32. In this locked position, it will be impossible to pull the first duct 18 away from the second duct 20. A secure seal is formed between the interior surfaces of the collar 12 and the exterior surfaces of the ducts 18 and 20. The annular seals 74 and 76 will further provide a strong liquid-tight seal against the outer surfaces of the respective ducts 18 and 20.

Figure 4:
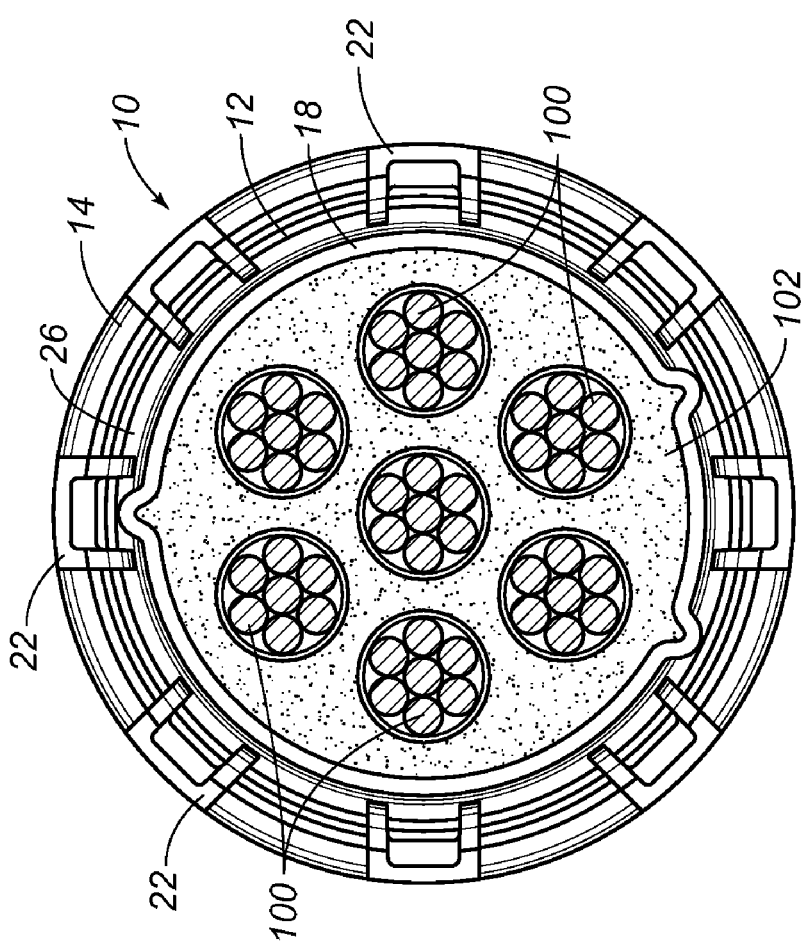
FIG. 4 is a cross-sectional view showing the interior of the ducts and the locking position of the finger elements over the ribs of the duct.

FIG. 4 shows that a plurality of tendons 100 extends longitudinally through the interior of the duct 18. The end portion 22 of the first coupler element 14 is illustrated as extending over the rib 26 of the duct 18. The end portion 22 has a generally U-shaped cross section. Each of the respective finger elements of the end portion 22 are radially spaced away from each other around the diameter of the collar 12. A grout material 102 fills the space on the interior of the duct 18 so as to further prevent liquid intrusion into the duct 18 and to prevent liquid contact with respective tendons 100. The tight sealing relationship between the coupler apparatus 10 and the exterior of the respective ducts 18 and 20 will prevent the grout material 102 from flowing outwardly therefrom.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:
1. An apparatus comprising:
  a first duct having a rib formed on an exterior surface thereof, said rib having an outer surface with a side wall extending therefrom;
  a second duct having a rib formed on an exterior surface thereof, said first and second ducts extending in longitudinal alignment, said rib of said second duct having an outer surface with a side wall extending therefrom;
  a collar receiving said first and second ducts therein in generally end-to-end relationship, said collar having a first end portion at one end thereof and a second end portion at an opposite end thereof, said each of said first and second end portions being flexibly movable between a first position spaced away from the rib of the respective duct and a second position extending toward the respective ribs of the respective ducts so as to abut the respective side wall of the respective duct;
  a first coupler element translatably secured to said collar, said first coupler element translatable so as to push said first end portion from said first position to said second position;

a second coupler element translatably secured to said collar, said second coupler element translatable so as to push said second end portion from said first position to said second position;

said first end portion comprising a plurality of finger elements extending outwardly of said end of said collar, said second end portion comprising a plurality of finger elements extending outwardly of said opposite end of said collar, said plurality of finger elements of said first end portion being radially spaced from each other around said diameter of said collar, said plurality of finger elements of said second end portion being radially spaced from each other around said diameter of said collar; and each of the finger elements having a shoulder formed on an inner surface thereof, said shoulder of the finger elements at said first end portion contacting said side wall of said rib of said first duct when the first end portion is in said second position, said shoulder of the finger elements of said second end portion contacting said side wall of said rib of said second duct when said second end portion is in said second position.

2. The apparatus of claim 1, said collar having a first annular seal interposed between an interior of said collar and said outer surface of said rib of said first duct, said collar having a second annular seal interposed between said interior of said collar and said outer surface of said rib of said second duct.

3. The apparatus of claim 1, said first coupler element being threadedly translatable on said collar, said first coupler element being rotatable so as to push said first end portion from said first position to said second position, said second coupler element being threadedly translatable on said collar, said second coupler element being rotatable so as to push said second end portion from said first position to said second position.

4. The apparatus of claim 1, each of said collar and said first and second coupler elements and said first and second ducts being formed of a polymeric material.

5. The apparatus of claim 1, each of said first and second coupler elements having a plurality of ribs formed on an exterior surface thereof, each of said plurality of ribs extending longitudinally for at least a portion of a length of the coupler element, said plurality of ribs being radially spaced from each other around a diameter of the coupler element.

6. The apparatus of claim 1, said collar having an indented portion formed generally centrally between said ends thereof, said indented portion positioned between adjacent ends of said first and second ducts such that an interior surface of said indented portion is generally aligned with an interior wall of said first and second ducts.

7. The apparatus of claim 1, further comprising:

a plurality of tendons extending longitudinally through an interior of said first and second ducts and through an interior of said collar.

8. The apparatus of claim 7, further comprising:

a grout material filling said interior of said first and second ducts, said collar and said first and second coupler elements forming a liquid-tight seal with said first and second ducts respectively so as to prevent grout from flowing outwardly of said first and second ducts and to prevent said first and second ducts from moving longitudinally away from each other when said first and second end portions are in said second position.

* * * * *